United States Patent
Vestlund et al.

(10) Patent No.: US 11,461,758 B2
(45) Date of Patent: Oct. 4, 2022

(54) METHOD FOR PAYMENT WITH CASH CARD

(71) Applicant: ID LOOP AB, Svedala (SE)

(72) Inventors: Jan Vestlund, Svedala (SE); Peter Thorander, Vallentuna (SE); Rolf Norberg, Täby (SE); Johan Anstrell, Knivsta (SE); Mikael Aronowitsch, Täby (SE); Anders Holmlund, Kungsängen (SE)

(73) Assignee: ID LOOP AB, Svedala (SE)

( * ) Notice: Subject to any disclaimer, the term of this patent is extended or adjusted under 35 U.S.C. 154(b) by 466 days.

(21) Appl. No.: 15/770,533

(22) PCT Filed: Oct. 20, 2016

(86) PCT No.: PCT/SE2016/051023
§ 371 (c)(1),
(2) Date: Apr. 24, 2018

(87) PCT Pub. No.: WO2017/074244
PCT Pub. Date: May 4, 2017

(65) Prior Publication Data
US 2019/0057370 A1  Feb. 21, 2019

(30) Foreign Application Priority Data
Oct. 30, 2015 (SE) .................................. 1551407-8

(51) Int. Cl.
*G06Q 20/26* (2012.01)
*G06Q 20/34* (2012.01)
(Continued)

(52) U.S. Cl.
CPC ........... *G06Q 20/26* (2013.01); *G06Q 20/085* (2013.01); *G06Q 20/0855* (2013.01);
(Continued)

(58) Field of Classification Search
None
See application file for complete search history.

(56) References Cited

U.S. PATENT DOCUMENTS 8,719,106 B2    5/2014  Bachenheimer
8,861,733 B2 * 10/2014  Benteo ................ H04L 63/0876
                                                        380/270
(Continued)

FOREIGN PATENT DOCUMENTS

EP    0798672 A2   10/1997
GB    2352861 A    2/2001
(Continued)

OTHER PUBLICATIONS

International Search Report from corresponding International Patent Application No. PCT/SE2016/051023, dated Jan. 25, 2017.
(Continued)

*Primary Examiner* — Neha Patel
*Assistant Examiner* — Nicholas K Phan
(74) *Attorney, Agent, or Firm* — Tucker Ellis LLP

(57) ABSTRACT

Method for cash card payment in a payment station for debit and credit cards. The invention is characterised in that the cash card (1) comprises a processor and is caused to store a unique identity associated with a money amount, which exists at a money institution (3), such as a central bank, or which is caused to be transferred from a bank account or the corresponding, to the money institution, in that the transferred amount is caused to be stored on the cash card (1), in that the amount lacks a connection to the proprietor of the cash card except via the said identity, in that, at payment using the cash card (1), the amount to be paid is caused to be transferred, together with the said identity, from the cash card (1) to a payment terminal (5) comprising the said payment station, in that the payment terminal (5) is caused to store the paid amount together with the said identity and
(Continued)

that a remaining amount after payment is counted down on the cash card and is stored on the cash card, and in that the payment terminal (5) is caused to activate the money institution (3) to transfer, using the identity, the amount to be paid using the cash card (1) to an account (7) belonging to the point of sale where the payment terminal (5) is located.

8 Claims, 1 Drawing Sheet

(51) Int. Cl.
| | |
|---|---|
| G06Q 20/38 | (2012.01) |
| H04W 12/02 | (2009.01) |
| G06Q 20/36 | (2012.01) |
| G06Q 20/20 | (2012.01) |
| H04L 9/40 | (2022.01) |
| H04W 12/10 | (2021.01) |
| G06Q 20/08 | (2012.01) |
| G06Q 20/32 | (2012.01) |
| G07F 7/02 | (2006.01) |
| H04W 12/04 | (2021.01) |
| H04W 12/71 | (2021.01) |

(52) U.S. Cl.
CPC .......... *G06Q 20/20* (2013.01); *G06Q 20/203* (2013.01); *G06Q 20/3223* (2013.01); *G06Q 20/3227* (2013.01); *G06Q 20/34* (2013.01); *G06Q 20/341* (2013.01); *G06Q 20/342* (2013.01); *G06Q 20/3433* (2013.01); *G06Q 20/367* (2013.01); *G06Q 20/383* (2013.01); *G07F 7/02* (2013.01); *H04L 63/0442* (2013.01); *H04W 12/02* (2013.01); *H04W 12/04* (2013.01); *H04W 12/10* (2013.01); *G06Q 2220/00* (2013.01); *H04W 12/71* (2021.01)

(56) References Cited

U.S. PATENT DOCUMENTS

| | | | |
|---|---|---|---|
| 2002/0055909 A1* | 5/2002 | Fung | G07F 7/00 705/42 |
| 2007/0083460 A1 | 4/2007 | Bachenheimer | |
| 2008/0179394 A1* | 7/2008 | Dixon | G06Q 20/382 235/380 |
| 2010/0241564 A1* | 9/2010 | Miller | G06Q 20/3221 705/43 |
| 2013/0138571 A1 | 5/2013 | Vassilev et al. | |
| 2015/0310419 A1* | 10/2015 | Kadaster | G06Q 20/322 705/72 |
| 2016/0071081 A1* | 3/2016 | Zheng | G06Q 20/4012 705/71 |
| 2016/0308862 A1* | 10/2016 | Rolfe | H04L 9/3228 |
| 2016/0335628 A1* | 11/2016 | Weigold | G06Q 20/3829 |
| 2017/0032362 A1* | 2/2017 | Lahkar | G06Q 20/3674 |

FOREIGN PATENT DOCUMENTS

| | | |
|---|---|---|
| WO | 9710560 A1 | 3/1997 |
| WO | 0111515 A2 | 2/2001 |
| WO | 0167407 A1 | 9/2001 |
| WO | 0190968 A1 | 11/2001 |
| WO | 03044710 A1 | 5/2003 |
| WO | 03083792 A2 | 10/2003 |

OTHER PUBLICATIONS

International Preliminary Report on Patentability from corresponding International Patent Application No. PCT/SE2016/051023, completed Feb. 28, 2018.

* cited by examiner

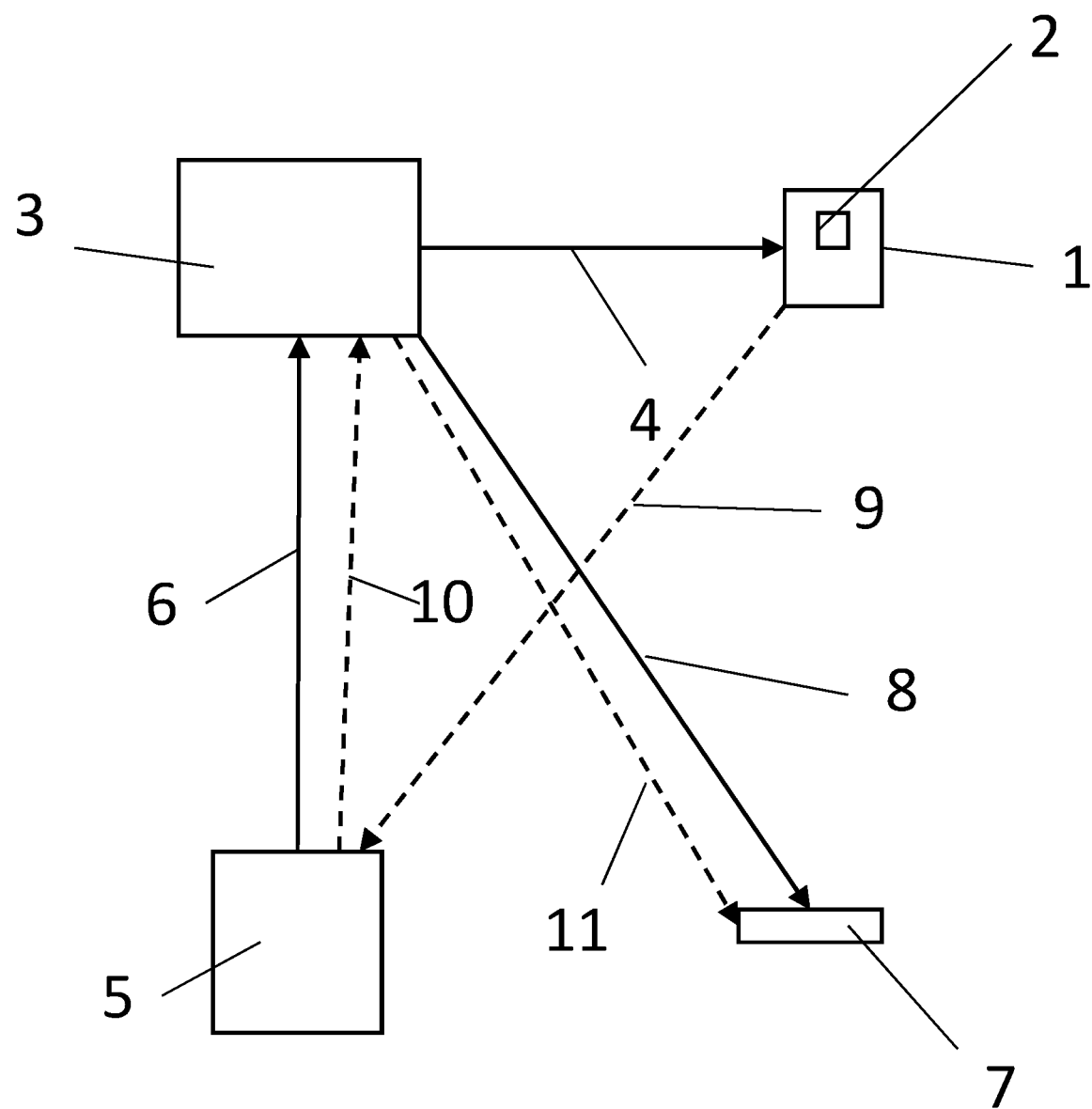

METHOD FOR PAYMENT WITH CASH CARD

The present invention relates to a method for payment with a cash card in the form of a card, like a credit card, a mobile telephone or a tablet computer for payment in a payment station for debit and credit cards, or another corresponding carrier. In the following, such carriers are termed cash cards.

Cash, bills and coins, is a practical and quick payment means, in particular for smaller money amounts. However, cash also has drawbacks, use and circulation of cash require counting, usually several times during a cycle from central bank to bank to consumer to point of sale and back to bank and central bank. The circulation of physical cash also requires costly transport, which in turn constitutes a risk exposure as larger volumes are handled, and facilitates robberies and robbery attempts.

It is usually the central banks that administer and finance the manufacture and distribution of such cash. The end customer does not see these costs that are split between merchants and banks, including central banks.

During the last several decades, debit and credit cards have come to replace cash for a large part of "larger" payments, and this trend is progressing downwards to smaller money amounts. The use of these cards is today cheaper than cash, as viewed from a societal perspective, but is also associated with costs for administration and risk (card fraud). In this case, these costs are split between the end customer and the point of sale, while the card companies and the bank system usually gain from the system. Central banks are not affected.

The cards used in these systems do not keep any money, they only constitute an identifier for being able to authenticate (using a PIN code) a specific registered user who is to be debited and invoiced the transaction which at each time is requested. The card emitting party pays money to the merchant, and periodically invoices the user, in case of a credit card, or debits the user's account, in case of a debit card connected to an own account. In order to maintain a certain security, at each transaction checks are performed regarding availability of funds and whether the user pays his or her invoices, if the user respects the current credit limit and if the card is blocked. This takes a certain amount of time, requires communication online and of course is also associated with certain costs.

The following is a description of a system, which mimics physical cash management but without physical cash in the form of bills and coins. The system comprises three central components or devices. These devices are an emitting party, a so called trusted partner; a carrier device, which may be for instance a so called smartcard, or a mobile telephone which comprises a SIM card which actually is a smartcard, or another comparable device; and a device for receiving a payment, which may for example be a so called payment terminal or a POS (Point Of Sale) terminal which exists at almost all payment locations today.

Hence, the present invention relates to a method for cash card payment in a payment station for debit and credit cards, and is characterised in that the cash card comprises a processor and is caused to store a unique identity associated with a money amount, which exists at a money institution, such as a central bank, or which is caused to be transferred from a bank account or the corresponding, to the money institution, in that the transferred amount is caused to be stored on the cash card, in that the amount lacks a connection to the proprietor of the cash card except via the said identity, in that, at payment using the cash card, the amount to be paid is caused to be transferred, together with the said identity, from the cash card to a payment terminal comprising the said payment station, in that the payment terminal is caused to store the paid amount together with the said identity and that a remaining amount after payment is counted down on the cash card and is stored on the cash card, and in that the payment terminal is caused to activate the money institution to transfer, using the identity, the amount to be paid using the cash card to an account belonging to the point of sale where the payment terminal is located.

BRIEF DESCRIPTION OF THE DRAWINGS

FIG. 1 is a schematic block diagram of an exemplary, non-limiting embodiment of system implementation one or more aspects.

DETAILED DESCRIPTION

Below, the invention is described in closer detail, partly in connection to an exemplifying embodiment illustrated in FIG. 1.

The invention relates to a method for cash card payment in a payment station for debit and credit cards. The purpose is to, for a payment, replace physical cash, in the form of bills and coins, with virtual cash stored at a card corresponding to a debit or credit card.

According to the invention, the cash card 1 comprises a processor 2. The cash card is caused to store a unique identity associated with an amount of money, which exists at a money institution 3, such as a central bank, or which is caused to be transferred from a bank account or the corresponding, to the money institution 3. The amount is caused to be stored on the cash card 1, as is illustrated by arrow 4 in FIG. 1.

The amount lacks any connection to the proprietor of the cash card, except via said identity, why the cash card as such is anonymous.

The cash card does not contain any information about the account number from which money is transferred to the money institution.

The identity may, among other things, be used to designate the money institution from which money was initially transferred, or to which money institution money was transferred.

At the time of payment using the cash card, the amount to be paid is caused to be transferred, together with the said identity, from the cash card 1 to a payment terminal 5 connected to the said payment station. The payment terminal with the payment station is suitably of the same type as conventional payment terminals for debit or credit cards. The cash card communicates with the payment terminal.

The payment terminal is caused to store the paid amount together with the said identity, and a remaining amount after the payment is counted down on the cash card and is stored on the cash card. Counting down may alternatively take place in the payment terminal.

The present invention can be adapted to function online or offline, even if the offline case is preferred.

Thereafter, the payment terminal 5 is caused to contact, and thereby activate, the money institution 3 for transferring, using the identity, the amount which is paid using the cash card 1, as is illustrated by the arrow 6, to an account 7 belonging to the point of sale at which the payment terminal is located, which is illustrated by arrow 8.

In case the purchase and the transfer of the amount to the seller's account take place simultaneously, it is an online purchase.

This way, a payment is performed, corresponding to a cash payment using physical money, where there are no connections between the cash card and the proprietor of the cash card.

Anyone can use the cash card for a payment, under condition that the cash card contains a required amount of money, as is the case with physical money.

The above described relates to a simple embodiment of the invention. However, there is a need to increase the security during the various transfers, why an embodiment with higher security is described in the following.

Also according to this embodiment, the cash card 1 is caused to store a unique identity but also a secret cryptographic key which is associated with an amount of money, which exists at the money institution, or which is caused to be transferred from a bank account or the corresponding, to the money institution 3. The amount lacks any connection to the proprietor of the cash card 1, except for via the said identity.

At the time of payment using the cash card 1, the amount to be paid, together with the said identity and any additional parameters, such as in the form of time of purchase, current amount and/or a random number, as well as a number calculated using the secret cryptographic key and by the cash card processor, is transferred from the cash card to a payment terminal 5, which is illustrated by the broken arrow 9. The payment terminal 5 is caused to store the current amount together with the said calculated number.

Thereafter, the payment terminal is caused to perform a calculation using the parameters that were used to perform the said calculation by the cash card processor, using the cash card's public cryptographic key. At a match between the number calculated by the cash card processor and the number calculated by the payment terminal, the payment terminal is caused to store the current transaction and to activate the money institution 3, which is illustrated using the broken arrow 10, to reimburse, using the cash card 1 identity, the amount to be paid to an account 7 belonging to the point of sale at which the payment terminal 5 is located, which is illustrated using the broken arrow 11. Usually, there will be a time difference between the counting down of the cash card amount and the transfer by the point of sale of the current amount or the daily statement. The amount on the cash card is caused to be counted down and to be stored after payment on the cash card 1. When payment has taken place using the reimbursement, it is preferred that the counted down amount exists on the cash card in order to, at the next payment, be able to know the available amount.

According to a preferred embodiment, at the said activation of the money institution the payment terminal 5 is caused to calculate a number based upon known parameters regarding the purchase and using a secret cryptographic key at the payment terminal. The payment terminal 5 is caused to transfer the said parameters and the said number to the money institution, and the money institution is caused to perform a calculation using the same parameters and using the public cryptographic key of the payment terminal, and when there is a match the said transfer takes place to an account belonging to the point of sale.

Since it is possible to carry through with a purchase using the cash card, this can be used to buy physical cash money at an automatic cash dispensing machine, such as an ATM.

By both the processor on the cash card, the payment terminal and the money institution performing calculations using secret and public cryptographic keys, the purchase, the payment terminal and also the cash card are authenticated. Hence, this results in a very safe system which is very difficult to manipulate.

According to a preferred embodiment, the said unique identity can be emitted by the money institution.

According to an alternative embodiment, the said unique identity is caused to be emitted by the cash card emitter.

According to another preferred embodiment, the said unique identity is stored on the cash card in encrypted form, and the money institution has a required decryption key.

According to an additional preferred embodiment, the cash card is caused to be stored in the memory or chip of a mobile telephone, and the mobile telephone is caused to communicate with the said payment terminal during a payment.

It is preferred that transmission of money to the cash card is caused to take place via a cash dispensing machine, such as an ATM or a charging teller or a POS or a computer or a so called smartphone.

It is also preferred that the payment terminal is caused to verify that a sufficient amount is present on the cash card before the payment is effected.

Above, a number of embodiments have been described. However, the invention can be varied. Hence, the choice of parameters for performing the above mentioned calculations can be other parameters than the ones mentioned above.

Therefore, the present invention is not to be considered limited to the above described exemplifying embodiments, but may be varied within the scope of the enclosed claims.

The invention claimed is:

1. A method comprising:
   storing proprietor information, associated with a cash card proprietor, at a money institution, wherein the proprietor information includes a proprietor identity, an account number, a unique identity, and a money amount;
   storing, on a cash card, the unique identity, a secret cryptographic key, and a
   money amount available on the cash card, wherein the cash card includes a processor, and wherein the cash card is linked to the proprietor by the unique identity and the proprietor identity, the account number, and the money amount at the money institution are not stored on the cash card;
   establishing communication between the cash card and a payment terminal to initiate a transaction, the transaction being performed offline without a connection to any financial institution;
   transferring, from the cash card to the payment terminal, the unique identity and a first random number calculated by the cash card using the secret cryptographic key;
   calculating, by the cash card, a new balance based on a payment amount of the money amount available on the cash card, wherein the new balance is subsequently stored on the cash card as the money amount available on the cash card;
   calculating, at the payment terminal, a second random number using a public cryptographic key associated with the cash card;
   determining, by the payment terminal, a match between the first random number and the second random number, wherein the match, when determined, authenticates the transaction;

storing, at the payment terminal, the unique identity and the payment amount to complete the transaction between the cash card and the payment terminal;

establishing communication, after completion of the transaction, between the payment terminal and the money institution; and activating an online transfer of the payment amount from the money amount at the money institution associated with the proprietor to an account associated with the payment terminal based on the unique identify, wherein the online transfer is authenticated using the unique identity.

2. The method according to claim 1, wherein, at the time of transaction the cash card transfers to the payment terminal the payment amount and the time of transaction.

3. The method according to claim 1, wherein, the unique identity is encrypted on the cash card, and wherein the money institution has a decryption key associated with the unique identity.

4. The method according to claim 1, wherein, the money institution produces the unique identity associated with a cash card proprietor.

5. The method according to claim 1, wherein, a trusted partner produces the cash card and the unique identity associated with a cash card proprietor.

6. The method according to claim 1, wherein, the cash card functions from a mobile phone, such that the mobile phone communicates with the payment terminal.

7. The method according to claim 1, wherein, the payment terminal is a cash dispensing machine.

8. The method according to claim 1, wherein, the payment terminal verifies payment amount is available on the cash card before completing the transfer.

* * * * *